Sept. 20, 1932.   J. A. McKAY ET AL   1,878,960
FERTILIZER DISTRIBUTOR
Filed May 27, 1930    3 Sheets-Sheet 1

JOHN A. McKAY,
PATRICK H. LYNCH,
By Herbert L. Davis,
Attorney

Sept. 20, 1932.  J. A. McKAY ET AL  1,878,960
FERTILIZER DISTRIBUTOR
Filed May 27, 1930   3 Sheets-Sheet 3

Inventors
JOHN A. McKAY,
PATRICK H. LYNCH,
By Herbert L. Davis,
Attorney

Patented Sept. 20, 1932

1,878,960

UNITED STATES PATENT OFFICE

JOHN A. McKAY AND PATRICK H. LYNCH, OF DUNN, NORTH CAROLINA

FERTILIZER DISTRIBUTOR

Application filed May 27, 1930. Serial No. 456,193.

This invention relates to agricultural implements and more particularly to fertilizer distributors such as are employed for depositing fertilizer or the like in a continuous stream along a single row.

Among the objects of the invention are to provide an improved combined machine having means by which either shovel plows or discs may be employed as desired, for covering the fertilizer; to provide an improved construction of hopper and controlling means therefor; to devise an improved mechanism for driving the hopper discharging means; and to improve generally on the details of construction of such machines.

In order that the invention may be readily understood, reference is had to the accompanying drawings, forming part of this specification, and in which:

Figure 5 is a fragmentary transverse section on the line 5—5 of Figure 3, looking in the direction of the arrows.

Figure 1:
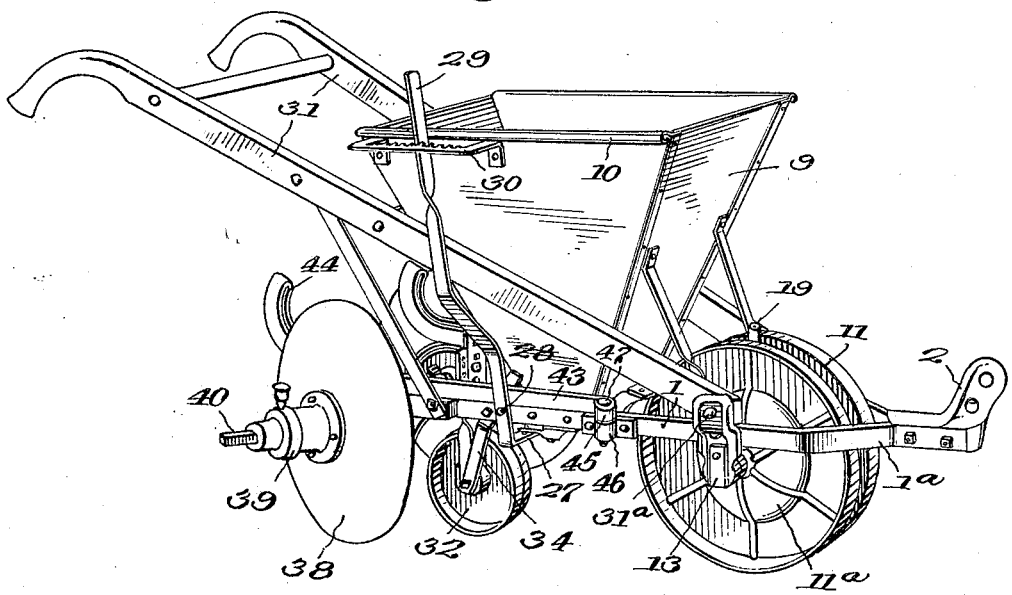
Figure 1 is a perspective view of our complete machine showing the same as equipped with covering discs.

Referring to the drawings in detail, our improved machine comprises a frame made up of a pair of longitudinally extending horizontal members 1 brought together at their front ends, as indicated at 1ª and secured to a draft block or pull iron 2.

Figure 3:
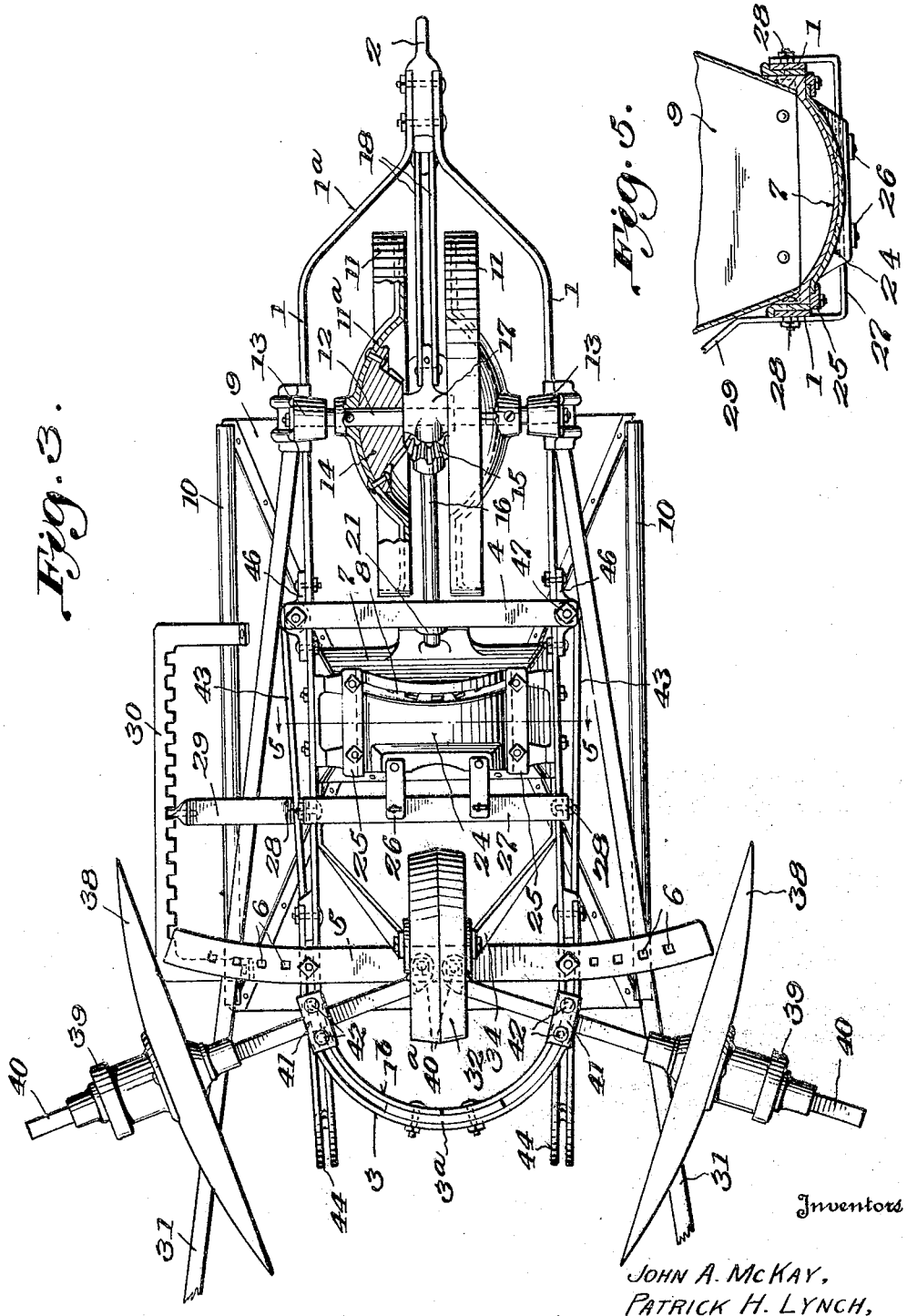
Figure 3 is an inverted plan view on an enlarged scale of the machine shown in Figure 1, parts being in section and parts being broken away.

The rear ends of the members 1 are bent around into arcuate or semi-circular form, as shown at 1ᵇ, and a similarly shaped frame member 3 is secured to the rear portion of the members 1 and spaced slightly therefrom, as by means of spacing blocks 3ª (see Figure 3). This provides arcuate slots between the member 3 and portions 1ᵇ of the members 1, the purpose of which will hereinafter appear.

Connecting the two longitudinal members 1 of the frame are transverse members 4 and 5, the former being positioned near the front of the machine and the latter at the rear. The ends of the member 5 project substantially beyond the members 1 and are provided with a series of bolt holes 6, as best shown in Figure 3.

Also, extending between and secured to the longitudinal members 1 of the frame is a casting 7 constituting the bottom of the hopper (see Figures 3 and 5). This casting is provided with a transversely extending slot or opening 8 through which the material in the hopper is discharged.

The hopper itself is designated at 9 and is preferably formed of sheet metal, the lower portion being secured to the cast metal bottom 7. Preferably the hopper is not provided with any cover, but is open at the top.

In machines of this character, many attempts have been made to satisfactorily finish and reinforce the upper edges of the sides of the hopper. A common method of doing this is to provide reinforcing elements of angle or other rolled shape and to secure such elements to the edges of the sheet metal. We have found, however, that better results can be obtained by not using any reinforcing elements whatever, but by simply rolling over the edges of the sheet metal to form a relatively large tube, as indicated at 10. This tubular structure not only imparts the necessary rigidity to the edge of the hopper, but also presents a round and smooth surface, so that bags of fertilizer can be conveniently supported on the edge of the hopper while being dumped, and all danger of tearing or snagging such bags is eliminated.

The front of our improved machine is supported by a ground wheel of improved construction. As clearly shown in the drawings, this consists of a pair of spaced parallel discs 11, having out-turned peripheral flanges constituting the tread. These discs are rigidly secured to a shaft 12, journalled in bearing brackets 13, bolted to the frame members 1.

The central portions of the discs 11 are bulged outward, as shown at 11ª, in order to provide a gear housing or chamber, and within such chamber is located a beveled gear 14, riveted or otherwise secured to one of the discs 11, as clearly shown in Figure 3.

This beveled gear meshes with a beveled pinion 15, fast on the end of a shaft 16. The extreme forward end of this shaft 16 is journalled in a special bearing block 17, through which the shaft 12 freely passes, such block being rigidly anchored in position by means of braces 18, secured at one end to the block and at the other end to the pull iron 2. An oil tube or cup 19 is preferably set into the block 17 and extends upwardly between the discs 11 to provide means for lubricating the engaging surfaces of the shaft 12 and block 17.

A dust guard or cover plate 20 extends over the gear 14 and pinion 15 so as to protect them from accumulations of foreign matter, this cover plate being secured to the block 17 and having a hole through which the oil tube 19 passes.

Figure 4:
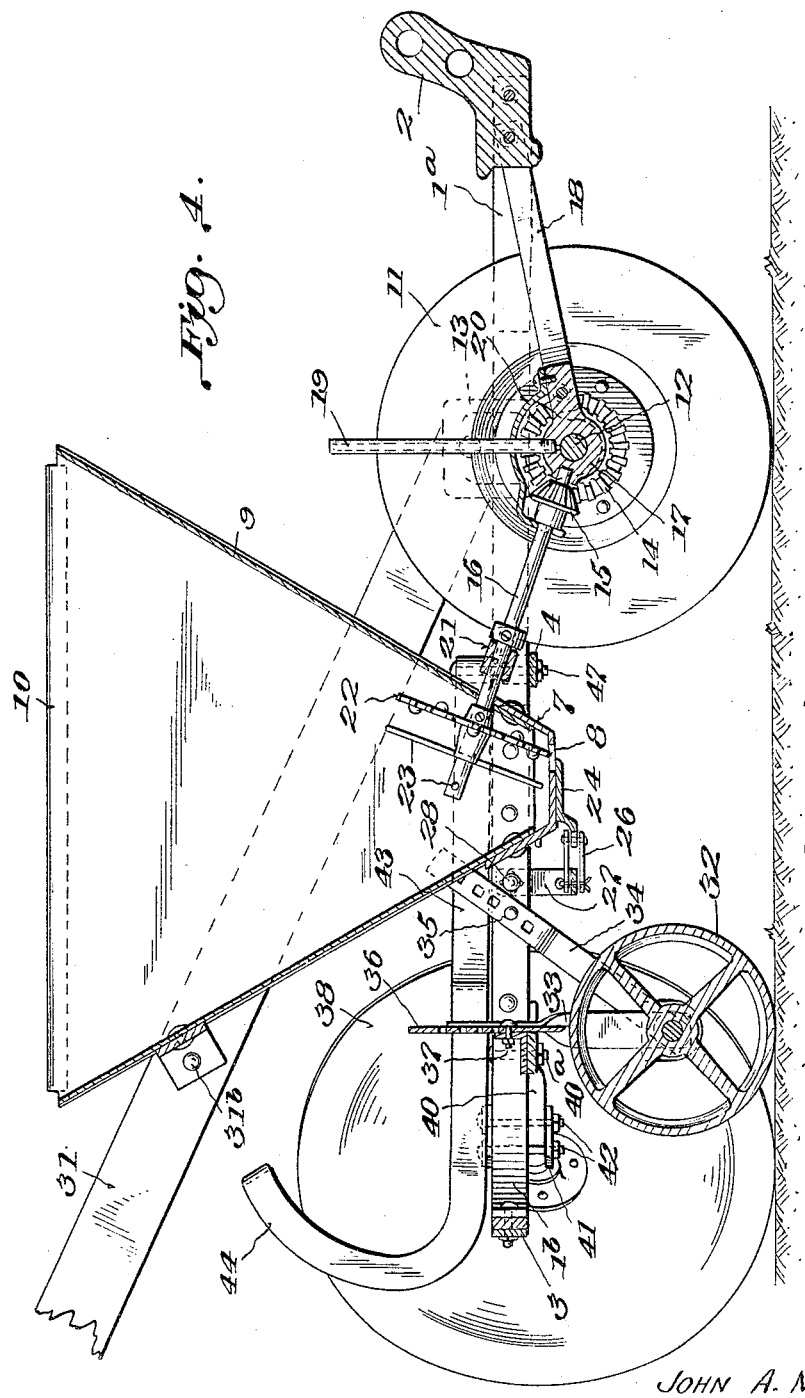
Figure 4 is a central vertical longitudinal section through the machine shown in Figures 1 and 3, parts being broken away.

The rear end of the shaft 16 is journalled in a bearing 21 carried by the hopper bottom 7, and passes through the wall of the hopper into the interior thereof. Inside the hopper, suitable stirring devices are secured to the shaft 16. As shown in Figure 4, these may consist of a disc 22 having any desired type of projections formed thereon, and one or more transversely extending pins 23. The disc 22 is preferably mounted immediately above the slot or opening 8 in the hopper bottom, and serves to feed the material therethrough.

In order to control and regulate the rate of discharge of the material from the hopper, we provide an improved cut-off plate 24 (see Figure 4). This is shaped to conform to and lies closely against the lower surface of the bottom 7 and is supported at its side edges in guides 25, so as to be capable of rectilinear movement. The rear edge of the cut-off plate 24 is connected by means of two or more links 26 to a swinging bail 27 pivotally mounted at its ends on the frame members 1 by means of bolts 28. This bail 27 is extended at one side to form an operating lever 29, which passes up along the side of the hopper, as clearly shown in Figures 1 and 2, and engages at its upper end with a locking rack 30, secured to the sides of the hopper. Obviously, by engaging the lever 29 with any desired one of the teeth or notches of this rack, the cut-off plate 24 may be locked in any desired position so as to regulate the size of the discharge opening 8, or to close it altogether. This is desirable when turning at the ends of rows, or when transporting the machine from place to place. By virtue of the improved discharging and regulating devices above described, we find that it is possible to produce an absolutely uniform feeding of the material, whether going up or down hill or on a level.

Figure 2:
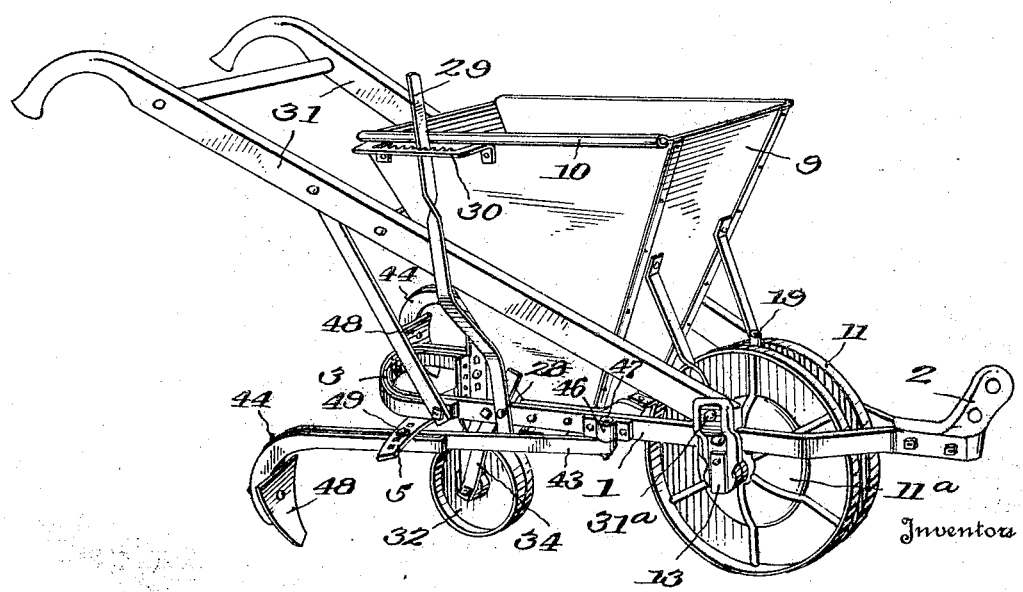
Figure 2 is a similar view showing the same machine with shovel plows substituted for the discs.

Our improved machine is controlled and guided by means of the usual handle bars 31, secured at their forward ends to the bearing brackets 13, as indicated at 31ª in Figure 2.

In order to regulate the depth to which the covering devices enter the ground, and to ease the draft of the machine, we provide a gage wheel 32 at the rear of the hopper. This is journalled at the lower end of a pair of vertically adjustable brackets 33, supported on the cross bar 5. Also supported on this cross bar by means of an angle bracket and bolt 37 is an adjustable scraper 36 adapted to keep the gage wheel clean. The gage wheel is further supported by means of a pair of forwardly extending adjustable braces 34, anchored to the frame members 1 by means of bolts 35.

Our improved machine is equipped with both plow shanks and disc holders, in order that either type of earth working tool may be employed for covering the fertilizer as desired. In Figures 1, 3 and 4, we have shown a pair of discs 38, journalled on bearings 39 secured to arms or shanks 40, preferably square in section. These arms 40 are pivotally secured at their inner ends to the cross bar 5, as indicated at 40ª in Figures 3 and 4. They pass just beneath the frame 1ᵇ and may be clamped in the desired angular position by means of shackles 41 secured by bolts 42, passing through the arcuate space or slot between the members 1ᵇ and 3 (see Figure 3). Thus, the covering discs may be swung to and secured in any desired position.

Our improved machine, as shown in Figures 1, 3 and 4, is also equipped, in addition to the discs 38, with plow shanks. These are shown as comprising bars 43 bent and doubled over at their rear ends to provide means for attaching the shovels.

These plow shanks are normally carried on the machine in inoperative position, as shown in Figures 1 and 4, that is to say, the shovel holding portion 44 is inverted, projecting upwardly instead of downwardly, and the bar 43 rests on top of the frame member 1. The bar 43 is provided at its forward end with an eye 45, adapted to register with a bearing bracket 46, and to be secured thereto by means of a bolt 47.

When it is desired to use shovel plows instead of the discs for covering the fertilizer, the discs are removed from the machine. This can be done either by slipping the bearings 39 off of the shanks or arms 40, or, preferably, by taking out the bolts 40ª and 42 and removing the arms and discs entirely from the machine. This is illustrated in Figure 2. After the discs have been thus removed, the bolts 47 are taken out and the plow shanks shifted from the inoperative position shown in Figure 1 to the operative position shown in Figure 2, and in such operative position, it will be seen that the shank 43 is disposed below the bearing bracket 46 and is pivotally secured thereto by means of the same bolt 47. A suitable shovel plow 48 is secured to the rear of the shank 43.

It will be further observed that the plow shanks 43 may be angularly adjusted about the pivot and secured in adjusted position by means of bolts 49 passing through any one of the holes 6 in the ends of the cross bar 5. Thus, the shovel plows may be set as far apart or as close together as desired.

From the foregoing, it will be seen that we have provided an improved fertilizer distributor equipped with both discs and plows for covering the fertilizer, either of which may be employed as desired, and it is thought that the many advantages possessed by our machine will be readily appreciated by those skilled in the art without further discussion.

What we claim is:

1. In a fertilizer distributor, the combination with a horizontal frame comprising a pair of spaced parallel members connected by an arcuate portion at the rear, a hopper and discharging mechanism therefor carried by said frame, a pair of disc supporting arms pivotally connected at one end to said frame, means whereby said arms may be secured at any desired adjusted position to the arcuate portion of said frame, and a pair of discs journalled on said arms beyond said frame.

2. In a fertilizer distributor, the combination with a frame comprising a pair of longitudinally extending members and a transversely extending member having its ends projecting beyond said first mentioned members, a hopper and discharge mechanism therefor carried by said frame, a pair of rigid, horizontally disposed plow shanks and means for pivotally securing the same at their forward ends to said longitudinally extending members forwardly of said transversely extending member, said pivotal securing means being so constructed that said shanks may be attached either above or below said longitudinally extending members, and additional means for anchoring said shanks to the projecting ends of said transversely extending member.

3. In a fertilizer distributor, the combination with a frame, of a hopper thereon, discharging means for said hopper, and means for driving said discharging means comprising a shaft extending from said hopper forwardly of said frame, a pinion secured to the forward end of said shaft, a pair of similar ground wheels of disc form rigidly connected to rotate together and spaced apart, with said shaft between them, one of said wheels being bulged outwardly at the center and a gear wheel carried by said ground wheel on the inside of the bulged portion thereof and meshing with said pinion.

4. In a fertilizer distributor, a hopper, discharging means therefor, and means for driving said discharging means, said last mentioned means comprising a pair of spaced parallel disc wheels mounted to rotate together, the central portion of one of said wheels being bulged outwardly to form a gear chamber, a gear wheel in said chamber connected to rotate with said disc wheels, a pinion meshing with said gear wheel and connected with said hopper discharging means, and a cover or housing for said gear and pinion overlying the same and disposed between said disc wheels.

5. In a fertilizer distributor, a hopper, discharging means therefor, and means for driving said discharging means, said last mentioned means comprising a pair of spaced parallel disc wheels mounted to rotate together, the central portion of one of said wheels being bulged outwardly to form a gear chamber, a gear wheel in said chamber connected to rotate with said disc wheels, a pinion meshing with said gear wheel, a shaft on which said pinion is rigidly secured and connected with said hopper discharging means, and a bearing block for said shaft fixedly supported between said disc wheels.

6. In a fertilizer distributor, a hopper, discharging means therefor, and means for driving said discharging means, said last mentioned means comprising a pair of spaced parallel disc wheels, a shaft to which both said disc wheels are rigidly secured, a gear wheel connected to rotate with said disc wheels, a pinion meshing with said gear wheel, a shaft on which said pinion is secured and connected with said discharging means, and a fixed bearing block through which said first mentioned shaft freely passes and in which the end of said pinion shaft is journalled.

In testimony whereof we affix our signatures.

JOHN A. McKAY.
PATRICK H. LYNCH.